Patented Nov. 24, 1953

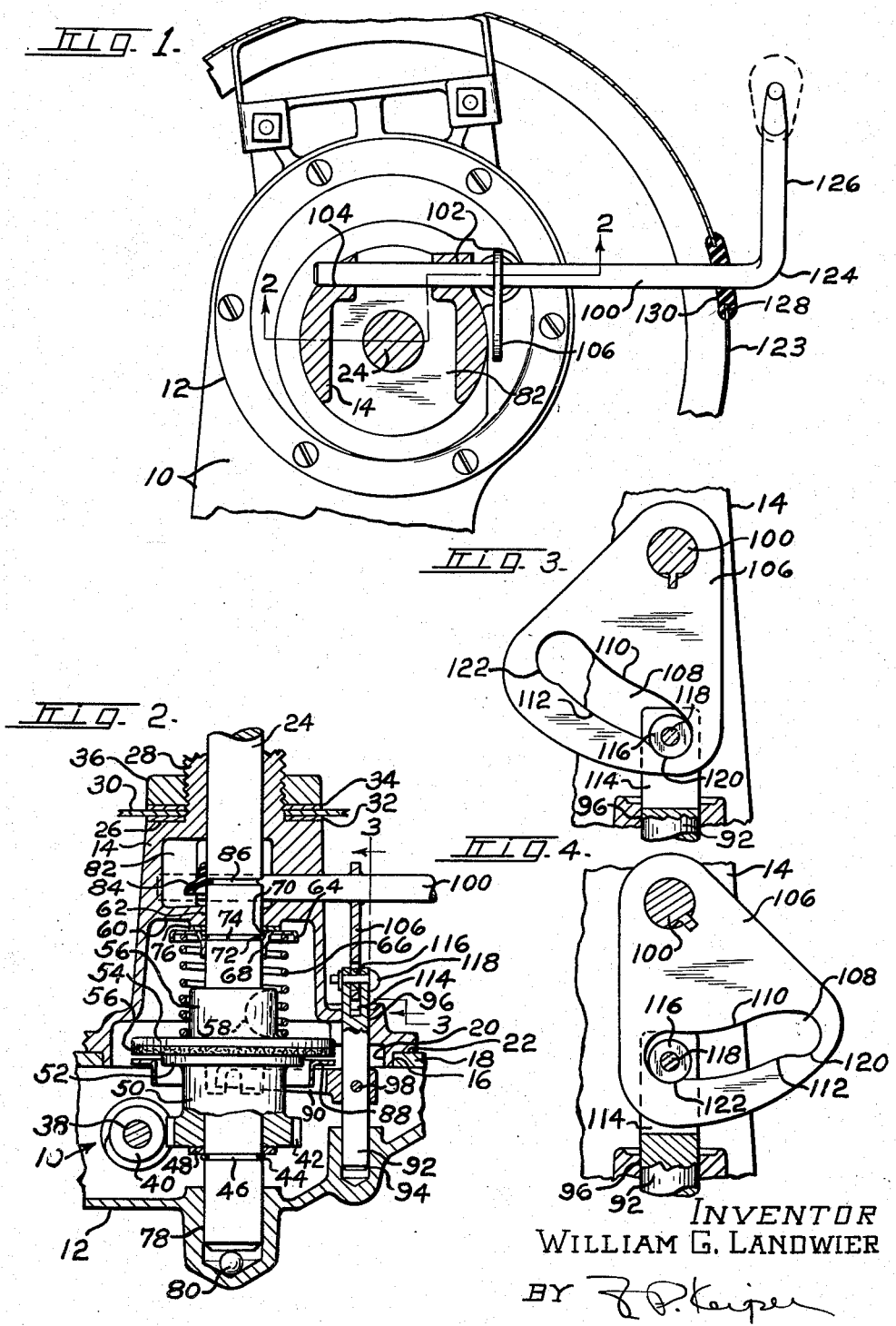

2,660,278

UNITED STATES PATENT OFFICE 2,660,278

CLUTCH AND BRAKE FOR WASHING MACHINES

William G. Landwier, Fayetteville, N. Y., assignor to Easy Washing Machine Corporation, Syracuse, N. Y., a corporation of Delaware Application July 18, 1950, Serial No. 174,398

4 Claims. (Cl. 192—18)

This invention relates to washing machines, and more particularly to washing machines of the centrifugal extractor type and controls therefor.

In washing machines having two tubs, in one of which centrifugal extraction takes place, it is usual to provide a common source of power for driving the agitator in the washing vat and the extractor tub. It is desirable to provide a clutch and brake mechanism for connecting the extractor to the source of power at will, initially through a friction drive which functions as a part of the clutch, and also to provide a brake so that the rotation of the extractor may be quickly stopped upon disengagement of the clutch. In such machines, the extractor basket rotates at relatively high speed, extracting water from clothes contained therein by centrifugal force. When such clothes are not loaded evenly within the basket, some vibration is present which requires the mechanism for holding the clutch engaged to be capable of retaining such engagement regardless of vibration. On the other hand, such control should be easily actuated by the operator, so that the clutch may be disengaged without appreciable effort.

The present invention relates to a rearrangement and improvement of structure such as is shown in Geldhof Patent No. 2,111,143, as well as the structure shown in Scheele Serial No. 792,363, filed December 18, 1947, now Patent No. 2,627,175, issued February 3, 1953. The present invention is directed to a simplification of the structure shown in the foregoing patents, whereby the control lever acts directly upon the clutch and brake actuating shifter fork through a simple cam having a contour such as to provide positive locking of the control in either an on or an off position.

The above and other novel features of the invention will appear more fully hereinafter from the following detailed description when taken in conjunction with the accompanying drawings. It is expressly understood that the drawings are employed for purposes of illustration only and are not designed as a definition of the limits of the invention, reference being had for this purpose to the appended claims.

In the drawings, wherein like reference characters indicate like parts:

Figure 1 is a top fragmentary sectional view through the drive shaft and transmission pedestal of an extractor type washing machine of the type described;

Figure 2 is a broken vertical section taken substantially on the line 2—2 of Figure 1;

Figure 3 is a fragmentary sectional detail taken on the broken vertical section line 3—3, the parts being in clutch-engaging position of Figure 2; and Figure 4 is similar to Figure 3, except that the control lever is shown in the extractor braking position.

Referring to the drawings, there is shown a transmission casing 10 composed of a main casting or other structure 12 having on the top thereof an upstanding bearing pedestal 14, the latter being seated in a circular aperture 16 in the top wall 18 of the transmission casing structure 12. The pedestal is provided with a centering flange 20 fitted in the aperture 16 and a shoulder 22 for accurate seating upon the transmission structure 12. Journaled in the casing structure and in the pedestal 14 is a vertical drive shaft 24 adapted to carry on its upper end an extractor basket, as will be understood in the art and from a reference to the patent and application hereinabove referred to. The pedestal 14 has an upper shoulder 26 and a threaded extension 28 in which a bearing sleeve may be contained, the shoulder being adapted to receive the bottom 30 of an extractor tub, the bottom being secured in place by the washers 32 and 34, and a clamp nut 36. A motor driven worm shaft 38 extends through the casing structure 12 in a susbtantially horizontal direction and has positioned thereon a drive worm 40 engaging with a driven pinion 42. In practice, the worm 40 and the pinion 42 may approach the form of helical gears, since it is desirable to cause the extractor shaft 24 to rotate at a relatively high speed in the order of 900 R. P. M., whereas the motor shaft 38 rotates at motor speed or 1750 R. P. M. The driven pinion 42 freely rotates upon the shaft 24 and is held in position by a split ring 44 lying in a groove 46 in the shaft, there being interposed a washer 48 between the split ring 46 and the pinion 42.

The pinion 42 has an elongated hub 50, the upper end of which is provided with a clutch face 52 adapted to cooperate with and drive a complementary driven clutch element 54 having a friction facing 56. Such driven clutch element is provided with a boss 56 which is keyed to the shaft 24 as at 58, the driven friction member being adapted to be slidably moved axially upon the shaft 24, but at all times rotate with said shaft.

The pedestal 14 may be provided with a transverse partition 60 having a central aperture 62 through which the shaft 24 freely projects, such partition being adapted to support an annular concave thrust washer 64 in which is positioned a compression spring 66, the latter being threaded over the hub 56 and bearing upon the driven clutch member in the manner shown. The thrust washer 64 has a downwardly extending sleeve 68, and internally thereof at the upper end there is provided a shouldered recess 70 adapted to receive a lock ring 72 lying in an annular groove 74 in the shaft 24. The shouldered recess 70 and the annular groove 74 are of such dimension as to jointly receive the lock ring 72 in a snug fashion, whereby the ring 72 will securely hold the thrust washer 64 and prevent the escape of the ring 72 so long as the thrust washer is maintained in its uppermost position as is its normal assembled position. A washer 76 may be provided upon the shaft 24 immediately above the thrust washer 64 in order to prevent end play of the shaft 24. The lower end of the shaft 24 is journaled in an integral bearing recess 78 in the casing structure 12, and rests upon an anti-friction thrust ball 80.

Between the transverse partition 60 and the shoulder 26 is a cavity or opening 82 providing space for a slinger ring 84 mounted in a groove 86 on the shaft 24.

In order to provide a brake for quickly retarding the rotation of the shaft 24, a flanged brake ring 88 is mounted beneath the clutch friction surface 56, the flanged ring surrounding the clutch face 52 and being mounted upon a shifter fork 90. The shifter fork in turn is rigidly supported upon a laterally positioned vertical shift rod 92 having sliding vertical movement up and down in spaced recesses 94 and 96 in the transmission casing structure 12, and the base of the pedestal 14, respectively. The yoke 90 is secured to the rod 92 by any suitable means such as a transverse pin 98.

It will be seen that upon movement of the yoke upwardly from the position shown in Figure 2, the brake ring 88 may be caused to engage the friction surface 56 and if elevated sufficiently, will lift such friction face 56 from the clutch face 52 resulting in braking of the rotation of the shaft 24 and release of the clutch.

In order to provide a positive and simple mechanism for moving the shifter fork 90 into braking position, and to lift the friction face 56 from the clutch face 52 against the urge of compression spring 66, a one-piece actuating mechanism comprising a transverse rock shaft 100 journaled in spaced bearings 102 and 104 in the pedestal 14 is provided, the rod having integrally secured thereto a cam member 106 having therein an elongated camming aperture 108 having inner and outer cam faces 110 and 112. Such cam is adapted to swing to and fro in the bifurcated end 114 of the shift rod 92 in which is positioned a cam engaging roller 116, such roller being mounted upon a transverse pin 118 extending through apertures in the bifurcated end 114 of the shift rod 92.

The cam face 112 is provided with end recesses 120 and 122 having substantially the contour of the roller 116 such that when the cam 106 is swung to the end positions shown in Figures 3 and 4, such recess will securely hold the cam in such position, thereby positively securing the shifter fork 92 either in the down position shown in Figure 2 or in an upper position in which such fork lifts the braking member 88 against the clutch face 56, lifting the same from the clutch face 52 against the urge of the compression spring 66. The rock shaft 100 may conveniently extend a sufficient distance outwardly from the pedestal through an aperture in the skirt or casing wall 123 of a washing machine, and there be bent at right angles as at 124, the rod extending a sufficient distance to provide a ready manually operable lever 126. Where the rock shaft 100 passes through the aperture 128 in the side wall 123, it may be provided with a suitable grommet 130 whereby any tendency of the rock shaft to vibrate will be silently controlled.

It will be seen from the foregoing disclosure that the rock shaft is a unitary structure capable of ready insertion into apertures provided in the pedestal and that axial movement of such shaft is confined and controlled by the cam 106 by reason of its positioning in the bifurcated end of the rod 92. The shaft may be inserted in the pedestal and assembled by rotation sufficient to bring the cam within the bifurcated end, after which the roller 116 and the pin 118 may be positioned in place, completing the assembly. It will appear that the structure thus provided has relatively few parts which may be readily fabricated and which may be assembled with a minimum of labor. Additionally, the cam 112, with its end recesses 120 and 122 are adapted to positively hold the rock shaft 100 in either of its end positions, that is with the clutch engaged or the brake engaged, regardless of any severe vibration which at times may occur due to a poorly balanced load mounted in the extractor basket upon the shaft 24.

While a single embodiment of the invention has been illustrated and described, it is to be understood that the invention is not limited thereto. As various changes in the construction and arrangement may be made without departing from the spirit of the invention, as will be apparent to those skilled in the art, reference will be had to the appended claims for a definition of the limits of the invention.

What is claimed is:

1. A washing machine of the centrifugal extractor type comprising, in combination, a vertical extractor shaft, a transmission casing member affording a bearing for said shaft, a clutch shifter slidably mounted in said casing member, and projecting outwardly therefrom, a rock shaft journaled in said casing member transverse to the line of movement of said shifter, and a cam member on said rock shaft lying and rocking substantially in the plane of said shifter, resilient biasing means for said shifter, said cam member having a spiral cam track bounded by detent recesses at either end, and cam follower means on said shifter riding on said cam and adapted to hold said cam when said follower is positioned in either recess and there held by said biasing means.

2. A washing machine of the centrifugal extractor type comprising, in combination, a vertical extractor shaft having driving and driven clutch elements thereon, a transmission casing member affording a bearing for said shaft, a clutch shifter slidably mounted in said casing member, said shifter coacting with one element on said shaft, and having a rod projecting out therefrom and slidably mounted therein for movement parallel with said shaft, a rock shaft journaled in said casing member transverse to the line of movement of said shifter, and a cam member on said rock shaft lying and rocking substantially in the plane of said shifter rod, resilient biasing means for said shifter, said cam member having a spiral cam track bounded by radially concave detent recesses at either end, and cam follower means on said shifter rod riding on said cam and adapted to hold said cam when said follower is held in either recess by said biasing means.

3. A washing machine extractor drive shaft and control assembly comprising, in combination, a housing cover plate, an extractor drive shaft extending through said cover plate, said shaft having a drive clutch and brake on one side of said cover plate, and said cover plate having an upstanding bearing support for said shaft on the other side, a clutch and brake actuating member having a rod slidable in said cover plate in a direction substantially parallel with said drive shaft, a rock shaft journaled in said bearing support substantially transverse to said drive shaft, and lying approximately in the plane of said sliding rod, a cam on said rock shaft having a radially inwardly directed cam surface, said rod being bifurcated to receive said cam, a roller follower on said rod, said cam surface having radially concave detent recesses to receive said follower at opposite ends thereof, and biasing means for said member to cause said follower to ride on said cam, and rest in either end recess to secure said rock shaft in either end position.

4. A washing machine extractor drive shaft and control assembly comprising, in combination, a housing cover plate, an extractor drive shaft extending through said cover plate, said shaft having a drive clutch and brake on one side of said cover plate, and said cover plate having an upstanding bearing support for said shaft on the other side, a clutch and brake actuating member slidable in said cover plate in a direction substantially parallel with said drive shaft, said member having a bifurcated end, a rock shaft journaled in said bearing support substantially transverse to said drive shaft, and lying approximately in the plane of said sliding member, a cam on said rock shaft positioned within said bifurcated end, a roller follower on said member journaled on a pin extending across the bifurcated end, said cam having a spiral cam opening having radially concave detent recesses to receive said follower at opposite ends thereof, and biasing means for said member to cause said follower to ride on one face of said cam, and rest in either end recess to secure said rock shaft in either end position.

WILLIAM G. LANDWIER.

References Cited in the file of this patent

UNITED STATES PATENTS

| Number | Name | Date |
| --- | --- | --- |
| 1,345,685 | Masury et al. | July 6, 1920 |
| 2,111,143 | Geldhof | Mar. 15, 1938 |
| 2,249,187 | Steiner | July 15, 1941 |
| 2,411,960 | Dyer | Dec. 3, 1946 |

FOREIGN PATENTS

| Number | Country | Date |
| --- | --- | --- |
| 166,318 | Great Britain | July 1, 1921 |